United States Patent
Platner et al.

(10) Patent No.: US 6,304,180 B1
(45) Date of Patent: Oct. 16, 2001

(54) HIGHLY VERSATILE OCCUPANCY SENSOR

(75) Inventors: Brian P. Platner, 100 Trailwood Dr., Guilford, CT (US) 06437; Philip H. Mudge, Brookfield; William J. Fassbender, Watertown, both of CT (US)

(73) Assignee: Brian P. Platner, Guilford, CT (US)

(*) Notice: Subject to any disclaimer, the term of this patent is extended or adjusted under 35 U.S.C. 154(b) by 0 days.

(21) Appl. No.: 09/292,057

(22) Filed: Apr. 14, 1999

Related U.S. Application Data

(60) Provisional application No. 60/081,946, filed on Apr. 15, 1998.

(51) Int. Cl.[7] ............................................. G08B 13/18
(52) U.S. Cl. ........................ 340/567; 307/117; 361/170
(58) Field of Search ................................. 340/541, 565, 340/567, 664; 307/116, 117, 131; 361/87, 170, 179, 187; 315/291, 307

(56) References Cited

U.S. PATENT DOCUMENTS

| | | | |
|---|---|---|---|
| 3,936,822 | 2/1976 | Hirschberg | 340/522 |
| 4,060,123 | 11/1977 | Hoffman et al. | 361/165 X |
| 4,169,982 | 10/1979 | Rittmann | 307/116 |
| 4,223,831 | 9/1980 | Szarka | 236/47 |
| 4,340,826 | 7/1982 | Muchnick | 307/157 |
| 4,346,427 | 8/1982 | Blissett et al. | 361/173 |
| 4,365,167 | 12/1982 | Weimer et al. | 307/117 X |
| 4,527,216 | 7/1985 | Stammely | 361/156 |
| 4,618,770 | 10/1986 | Maile | 340/567 X |
| 4,630,684 | 12/1986 | Cinzori et al. | 340/522 X |
| 4,703,171 | 10/1987 | Kahl et al. | 340/567 X |
| 4,746,906 | 5/1988 | Lederer | 340/522 |
| 4,772,875 | 9/1988 | Maddox et al. | 340/522 |
| 4,825,079 | 4/1989 | Takamatsu et al. | 250/338.3 |
| 4,874,962 | 10/1989 | Hermans | 307/116 |
| 4,890,093 | 12/1989 | Allison et al. | 340/567 |
| 4,975,584 | 12/1990 | Benjamin et al. | 250/372 |
| 5,015,994 | 5/1991 | Hoberman et al. | 340/567 |
| 5,023,593 | 6/1991 | Brox | 340/567 X |
| 5,128,654 | 7/1992 | Griffin et al. | 340/567 |
| 5,142,199 | 8/1992 | Elwell | 340/567 X |
| 5,151,840 | 9/1992 | Siefken | 361/13 |
| 5,153,560 | 10/1992 | Ichikawa | 340/522 |
| 5,189,393 | 2/1993 | Hu | 340/522 |
| 5,266,807 | 11/1993 | Neiger | 340/567 X |
| 5,276,427 | 1/1994 | Peterson | 340/522 |
| 5,307,051 | 4/1994 | Sedlmayr | 340/573.1 |
| 5,361,064 | * 11/1994 | Hamer et al. | 340/939 |
| 5,386,210 | 1/1995 | Lee | 340/567 |
| 5,428,345 | 6/1995 | Bruno | 340/567 X |
| 5,534,850 | 7/1996 | Lee | 340/567 X |
| 5,701,117 | 12/1997 | Platner et al. | 340/567 |
| 5,909,378 | * 6/1999 | De Milleville | 700/276 |
| B1 4,874,962 | 4/1995 | Hermans | 307/116 |

OTHER PUBLICATIONS

"CX–100 Passive Infrared Sensor" (data sheet), Publication No. 6301, published by The Watt Stopper®, Inc., of Santa Clara, California (undated).

* cited by examiner

*Primary Examiner*—Thomas Mullen
(74) *Attorney, Agent, or Firm*—Fish & Neave; Garry J. Tuma

(57) ABSTRACT

An occupancy sensor is provided that can operate within an extended range of AC and DC input voltages, enabling the sensor to be used in different electrical environments. The sensor draws substantially only an amount of current required by the sensor at the moment, which reduces power waste. The sensor includes a relay that de-energizes when occupancy is sensed and energizes when occupancy is not sensed. This reduces peak sensor current, permitting the sensor to maintain a more constant average current. A shutdown mode is provided to prevent sensor damage or destruction should excessive output current be drawn from the sensor. The sensor also includes a second output at which occupancy signals are provided when an occupancy signal is present at the first output.

34 Claims, 6 Drawing Sheets

HIGHLY VERSATILE OCCUPANCY SENSOR

CROSS REFERENCE TO RELATED APPLICATION

This claims the benefit of U.S. Provisional Application No. 60/081,946, filed Apr. 15, 1998.

BACKGROUND OF THE INVENTION

This invention relates to occupancy sensors. More particularly, this invention relates to occupancy sensors having a high degree of versatility with respect to AC and DC input voltage ranges, control devices for electrical appliances, and joint operation with multiple occupancy sensors.

Occupancy sensors typically sense the presence of one or more persons within a designated area and generate occupancy signals indicative of that presence. These signals are transmitted to a control device, which may be a computerized building automation system, a power pack (e.g., the Sensor Switch PP-20, manufactured by Sensor Switch Incorporated, of Wallingford, Conn.), or a simple low voltage transformer and relay. The control device responds to the occupancy signals by activating or deactivating one or more electrical appliances, such as, for example, room lighting or an HVAC (heating, ventilating, and air conditioning) system. Occupancy sensors help reduce electrical energy and maintenance costs by indicating when these appliances can be turned off.

Occupancy sensors are typically used in a variety of commercial, industrial, and residential settings. These settings typically have different electrical environments. For example, in some settings AC line voltage may be 120, 277, or 347 volts. In other settings, AC line voltage may not be available, thus requiring the use of DC voltage supplies.

A disadvantage of known occupancy sensors is that they typically operate within only a narrow range of either AC or DC input voltage. For example, many known sensors operate at only 120 volts AC, ±10%. Such sensors are not likely to operate at, for example, 12 volts DC or 240 volts AC. Similarly, an occupancy sensor that can operate at 24 volts DC, ±10%, cannot likely operate at an AC line voltage of 347 volts. Thus, known occupancy sensors are generally limited to a particular input voltage range and type (AC or DC).

Furthermore, known control devices have non-standardized input signal requirements. Known occupancy sensors typically cannot modify the electrical parameters of their output signals to conform to different control device input requirements. Thus, known occupancy sensors are also generally limited to those control devices whose input signal requirements are compatible with the electrical parameters of the output signals of the sensor.

Another disadvantage of known occupancy sensors is that they continuously draw a substantially fixed amount of current. This fixed amount of current is usually equal to the peak current of the sensor. Peak current, however, is only required when occupancy is sensed, which is when most circuit activity occurs. Thus, power is wasted in stand-by mode (i.e., when the sensor is not sensing occupancy). Moreover, by continuously drawing peak current, an input voltage source or supply may be unable to power additional occupancy sensors in settings where all sensors are not likely to be sensing occupancy at the same time (and thus not all requiring peak current at the same time). Furthermore, the difference between a known sensor's peak current and its average current is typically significant. Thus the power waste in stand-by mode is also typically significant.

Still another disadvantage of known occupancy sensors is their inability to prevent sensor damage or destruction should their output become short-circuited or overloaded. For example, if a sensor were accidently coupled to a voltage higher than its normal operating voltage, or if the output of the sensor were accidently coupled to ground, known occupancy sensors generally cannot prevent excessive output current from damaging or destroying the sensor.

Other disadvantages of known occupancy sensors involve joint control of two or more electrical appliances by a group of sensors. If the control devices controlling the electrical appliances are all electrically compatible (i.e., each control device correctly responds to the same input signals), the output of each sensor can be coupled in parallel to the control devices. When occupancy is sensed by any one of the sensors, the generated occupancy signal is then transmitted to the control devices, which respond accordingly.

If, however, two of the control devices are not electrically compatible (i.e., each control device requires input signals not correctly recognized by the other), then these control devices should be coupled to separate occupancy sensor outputs that provide respectively compatible signals. Such dual-output occupancy sensors are known. These sensors generate output signals at their first and second outputs that are each respectively compatible with many known control devices.

Typically, however, these known dual-output sensors generate first and second output signals, when only they sense occupancy. In other words, known dual-output occupancy sensors typically do not generate occupancy signals for their second output in response to the presence of occupancy signals at their first output. For example, if the outputs of a group of single-output occupancy sensors are coupled in parallel to the first output of a known dual-output occupancy sensor, an occupancy signal generated by one of the single-output sensors will appear at the output of all sensors, including the first output of the dual-output sensor (because their outputs are coupled in parallel). However, that occupancy signal will not appear at the second output of the dual-output sensor, because occupancy was not sensed by that dual-output sensor. Occupancy signals are typically only generated for the second output when only the dual-output sensor senses occupancy and not when an occupancy signal is present at the first output.

Thus, when a group of known occupancy sensors jointly provide occupancy signals to two electrically incompatible control devices, each sensor in the group should be a dual-output sensor. Dual-output sensors, however, are usually more expensive than the single-output type, thus the cost of providing such a group of sensors increases. Furthermore, this group of sensors requires two sets of wiring; one to couple the first outputs to the first control device, and the other to couple the second outputs to the second control device. This increases the costs of material and installation.

In view of the foregoing, it would be desirable to provide an occupancy sensor that operates within an extended range of AC and DC input voltages.

It would also be desirable to provide an occupancy sensor that draws substantially only an amount of current required by the sensor at the moment.

It would further be desirable to provide an occupancy sensor that operates with a small difference between its peak and average currents.

It would still further be desirable to provide an occupancy sensor that shuts down when output current becomes excessive.

It would yet further be desirable to provide an occupancy sensor that generates an occupancy signal for a second output in response to the presence of an occupancy signal at a first output.

SUMMARY OF THE INVENTION

It is an object of this invention to provide an occupancy sensor that operates within an extended range of AC and DC input voltages.

It is also an object of this invention to provide an occupancy sensor that draws substantially only an amount of current required by the sensor at the moment.

It is a further object of this invention to provide an occupancy sensor that operates with a small difference between its peak and average currents.

It is still a further object of this invention to provide an occupancy sensor that shuts down when output current becomes excessive.

It is yet a further object of this invention to provide an occupancy sensor that generates an occupancy signal for a second output in response to the presence of an occupancy signal at a first output.

In accordance with this invention, an occupancy sensor that provides occupancy signals to at least one control device is presented. The sensor includes an input voltage terminal for receiving an input voltage, sensing circuitry operable to sense occupancy within a designated area, output circuitry coupled to the sensing circuitry and operable to generate a first occupancy signal, a first output terminal coupled to the output circuitry for outputting the first occupancy signal, and voltage regulation circuitry operable to regulate both AC and DC input voltages within a range of voltages. The range of voltages is greater than about 20% of an input voltage preferably not exceeding about 380 volts. The voltage regulation circuitry is coupled to the input voltage terminal, the sensing circuitry, and the output circuitry.

The voltage regulation circuitry regulates AC or DC input voltages that can range from about 3 volts to about 380 volts.

The occupancy sensor preferably includes a second output terminal for outputting a second occupancy signal, and preferably includes output follower circuitry operable to monitor the first output terminal and to generate a second occupancy signal indicative of a first occupancy signal monitored at the first output terminal. The output follower circuitry preferably has very high input impedance to substantially prevent any loading on the first output terminal. The first and second occupancy signals may respectively conform to different control device input signal requirements. The output follower circuitry is coupled to the regulation circuitry, the first output terminal, and the second output terminal.

The output follower circuitry preferably includes a relay coil. The relay coil is energized in stand-by mode (i.e., when occupancy is not sensed) and de-energized in occupancy mode (i.e., when occupancy is sensed). This reduces the difference between peak and average sensor currents, enabling the sensor to maintain a more constant average current. To prevent operation of the relay coil from falsely tripping the occupancy sensor when the sensor switches from occupancy mode to stand-by mode, the output follower circuitry preferably prevents first occupancy signals from being generated while a second occupancy signal indicating occupancy switches to a second occupancy signal indicating non-occupancy.

The occupancy sensor preferably shuts down to prevent sensor damage or destruction when the output current becomes excessive. The sensor remains shut down for a predetermined time period, after which the sensor resumes normal operation. If the output current is still excessive upon resumption of normal operation, the sensor again shuts down for the predetermined time period. This cycle continues until the output current is no longer excessive.

The occupancy sensor preferably draws substantially only an amount of current required by the sensor at the moment.

The present invention also includes an occupancy sensor system that has a plurality of occupancy sensors for jointly providing occupancy signals to two control devices whose input signal requirements may be electrically incompatible. Each occupancy sensor has a first output terminal coupled in parallel with the first output terminals of the other sensors. The occupancy signals at the first output terminal are electrically compatible with the input signal requirements of the first control device. At least one occupancy sensor has a second output terminal and output follower circuitry. The output follower circuitry monitors the first output terminal and generates occupancy signals indicative of occupancy signals monitored at the first output terminal. The generated signals are output at the second output terminal, and are electrically compatible with the input signal requirements of the second control device.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
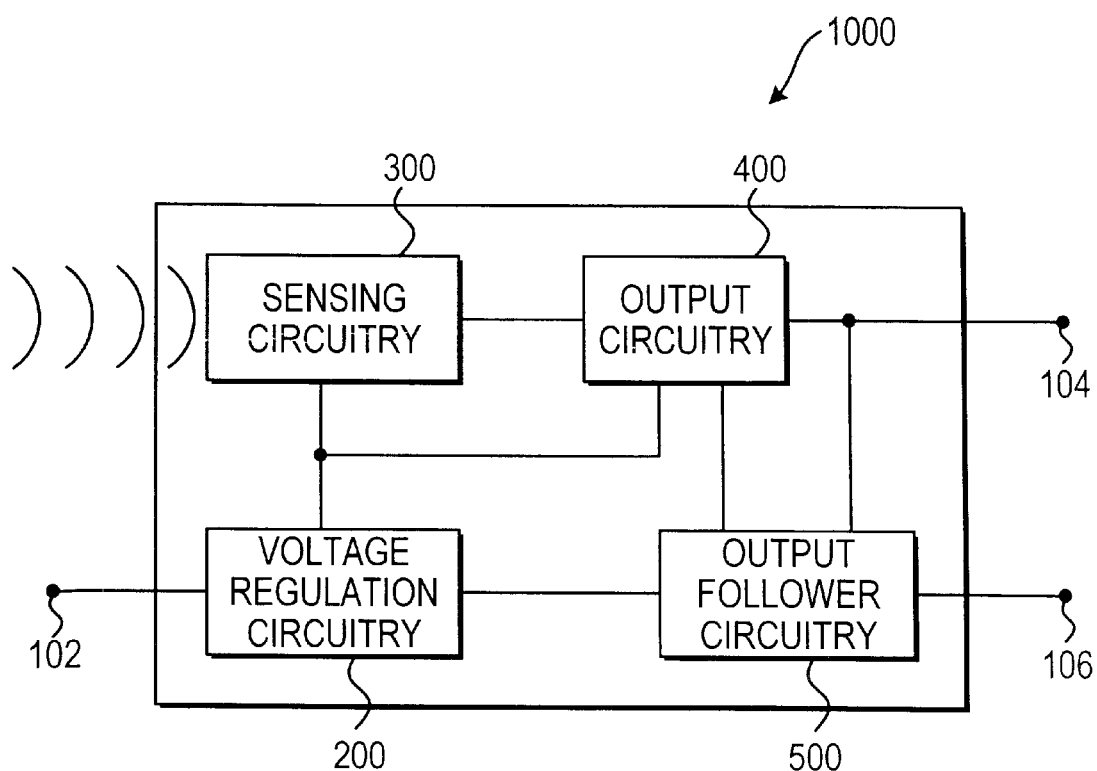
FIG. 1 is a block diagram of an exemplary embodiment of an occupancy sensor according to the present invention.

FIG. 1 shows an exemplary embodiment of occupancy sensor 1000 constructed in accordance with the present invention. Occupancy sensor 1000 includes input voltage terminal 102, voltage regulation circuitry 200, sensing circuitry 300, output circuitry 400, and first output terminal 104. Occupancy sensor 1000 preferably also includes output follower circuitry 500 and second output terminal 106.

Voltage regulation circuitry 200 regulates both AC and DC input voltages within an extended range of voltages to provide at least one regulated DC voltage to sensing circuitry 300, output circuitry 400, and output follower circuitry 500. Voltage regulation circuitry 200 regulates AC or DC input voltages that can range from about 3 volts to about 380 volts. This advantageously permits occupancy sensor 1000 to be used in different electrical environments. Furthermore, voltage regulation circuitry 200 draws substantially only an amount of current required by sensor 1000 at the moment, thus reducing power waste common in known occupancy sensors. Moreover, by drawing substantially only an amount of current required at the moment, sensor 1000 may enable an external power source or supply to power additional sensors.

Sensing circuitry 300 senses the presence of one or more persons within a designated area. Preferably, sensing circuitry 300 includes passive infrared sensing technology, which senses the heat differential between a person and the background of the designated area, and generally results in less false-tripping than other sensing technologies. Alternatively, however, sensing circuitry 300 can include other sensing technologies such as, for example, ultrasonic sensing, photoelectric sensing, sound sensing, or any combination thereof, now known or later developed. When occupancy is sensed, sensing circuitry 300 signals output circuitry 400.

Output circuitry 400 generates occupancy signals that are output at first output terminal 104, which is typically coupled to one or more control devices that regulate the ON/OFF operation of one or more electrical appliances. These control devices can include, for example, various types of automated control and information systems (e.g., a building security system).

Output circuitry 400 preferably monitors the output current at first output terminal 104 to protect occupancy sensor 1000 from damage or destruction caused by overloads or short circuits. When excessive output current is being drawn, output circuitry 400 stops processing signals received from sensing circuitry 300, effectively shutting down sensor 1000. After a predetermined time period, output circuitry 400 resumes normal operation. If the overload or short circuit still exists upon resumption of normal operation, output circuitry 400 again stops processing signals from sensing circuitry 300. This cycle continues until the overload or short circuit is removed.

Output follower circuitry 500 monitors first output terminal 104 and generates occupancy signals indicative of occupancy signals monitored at first output terminal 104. The signals generated by output follower circuitry 500 are output at second output terminal 106, and may have electrical parameters (e.g., current and voltage levels) different than those at output terminal 104. Thus, second output terminal 106 can be coupled to a second control device whose input signal requirements are different than those of control devices coupled to first output terminal 104.

Output follower circuitry 500 preferably includes a relay coil. Unlike known occupancy sensors, the relay coil energizes when occupancy sensor 1000 goes into stand-by mode (i.e., occupancy is not sensed) and de-energizes when sensor 1000 goes into occupancy mode (i.e., occupancy is sensed). This significantly reduces the peak current of sensor 1000. Known occupancy sensors usually de-energize their coil in stand-by mode and energize them in occupancy mode, thus increasing their peak currents. Sensor 1000 thus operates with a smaller difference between its peak and average currents, resulting in a more constant average current.

Moreover, known occupancy sensors having relay coils generally require the sensor input voltage to match the voltage rating of the coil. This limitation is unnecessary in occupancy sensor 1000, because voltage regulation circuitry 200, which can regulate an extended range of AC and DC input voltages, can provide, as described below, customizable internal voltages to sensor circuit components, including the relay coil.

Figure 2:
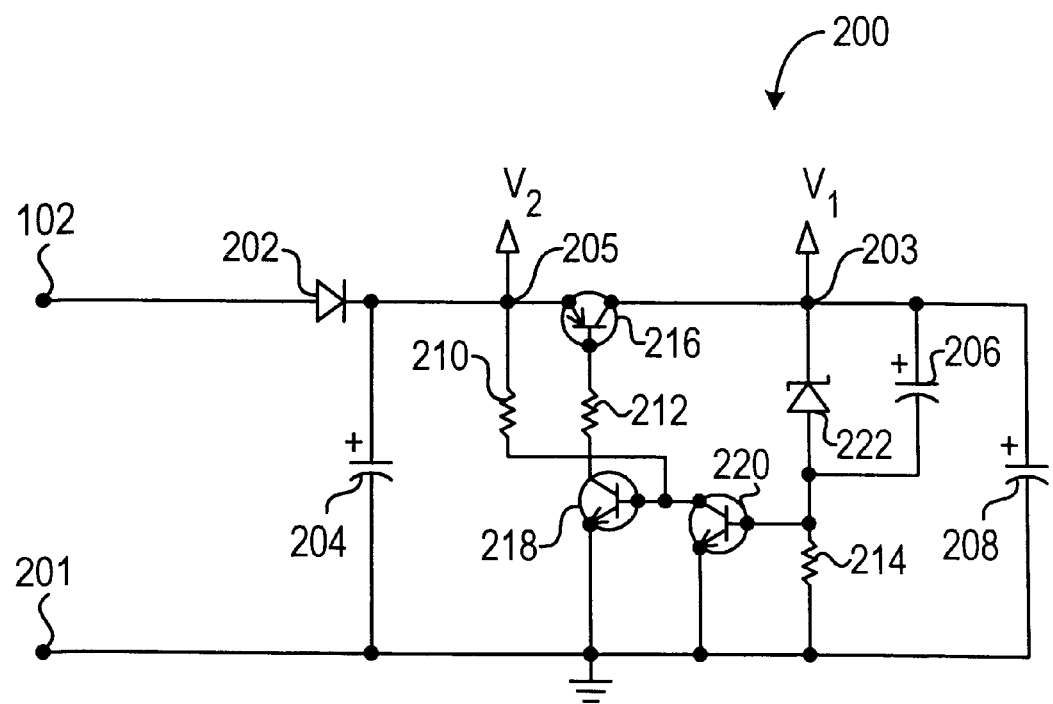
FIG. 2 is a circuit diagram of an exemplary embodiment of the voltage regulation circuitry of the occupancy sensor of FIG. 1 according to the present invention.

An exemplary embodiment of voltage regulation circuitry 200 constructed in accordance with the present invention is shown in FIG. 2. Voltage regulation circuitry 200 receives input voltage at input voltage terminal 102 and couples to ground or neutral at ground terminal 201. Voltage regulation circuitry 200 includes rectifying diode 202; capacitors 204, 206, and 208; resistors 210, 212, and 214; PNP transistor 216; NPN transistors 218 and 220; and Zener diode 222. Voltage regulation circuitry provides first voltage $V_1$ at node 203 and second voltage $V_2$ at node 205.

Diode 202 and capacitor 204 rectify and filter AC input voltages. $V_2$ is a DC voltage directly tracking the input voltage. PNP transistor 216 is a series pass transistor that provides variable effective resistance. Accordingly, $V_1$ is equal to $V_2$ minus the voltage drop across PNP transistor 216. Capacitor 206 smoothens out $V_1$ noise caused by Zener diode 222, and capacitor 208 provides additional filtering of $V_1$.

To regulate the variable effective resistance across PNP transistor 216, NPN transistor 218 controls the base current of PNP transistor 216. As NPN transistor 218 varies between ON and OFF, its effective collector-emitter resistance varies. This causes the base current of PNP transistor 216 to vary, which in turn causes the emitter-collector resistance across PNP transistor 216 to vary (i.e., PNP transistor 216 is operated in the active and saturation regions). When NPN transistor 218 is fully ON, PNP transistor 216 is fully ON (i.e., it is saturated). This results in a very low effective emitter-collector resistance, which permits substantially the full voltage at node 205 to pass to node 203.

The breakdown voltage of Zener diode 222 sets the value of $V_1$. Zener diode 222, operating in reverse bias mode, maintains this value by controlling the base current to NPN transistor 220, which controls NPN transistor 218. For example, if the load on $V_1$ (i.e., sensing circuitry 300, output circuitry 400, and output follower circuitry 500) causes $V_1$ to decrease, Zener diode 222 responds by decreasing the current to NPN transistor 220. This causes NPN transistor 220 to begin turning OFF, which increases base current to NPN transistor 218, turning it ON more fully. PNP transistor 216 then also turns ON more fully, decreasing the effective resistance across its emitter-collector junction. $V_1$ then increases toward its set value (i.e., the Zener diode 222 breakdown voltage).

If the load causes $V_1$ to increase, Zener diode 222 responds by increasing the current to NPN transistor 220, turning it ON more fully. NPN transistor 218 then begins turning OFF, which causes PNP transistor 216 to begin turning OFF. This increases the effective resistance across PNP transistor 216, which causes $V_1$ to decrease toward its set value.

By regulating $V_1$ in this manner, voltage regulation circuitry 200 draws substantially only an amount of current through input voltage terminal 102 required by occupancy sensor 1000 at the moment.

To regulate AC and DC voltages ranging from about 3 volts to about 380 volts, values for the circuit components of voltage regulation circuitry 200 are as follows: diode 202, which is preferably voltage rated for at least twice the maximum input voltage (i.e., the peak inverse voltage), has a breakdown voltage rating of preferably about 1000 volts (which includes a safety margin) and an associated current rating of preferably about 1 amp. Capacitor 204 preferably has a minimum voltage rating of about 500 volts and a value of about 220 μF. PNP transistor 216 is preferably a high voltage, power transistor having a minimum collector-emitter and base-emitter breakdown voltage rating of preferably about 500 volts. Furthermore, because the voltage drop across PNP transistor 216 can be high (e.g., several hundred volts), PNP transistor 216 may require a heat sink. NPN transistor 218 is also preferably a high voltage transistor. However, because NPN transistor 218 handles only PNP transistor 216 base current, it need not be a power transistor. NPN transistor 220, Zener diode 222, and capacitors 206 and 208 are typically low voltage components whose values are determined in accordance with the selected value of $V_1$.

$V_1$ is selected in conjunction with the selected minimum input voltage. Typically, $V_1$ ranges from about 3 volts to about 12 volts, and is typically selected to match the voltage rating of an internal relay coil, described below with respect to output follower circuitry 500.

Voltage regulation circuitry 200 can be designed to regulate other ranges of input voltages by first identifying the minimum and maximum input voltages and then determining appropriate circuit component values. For example, the peak inverse voltage of diode 202 should be greater than the maximum peak-to-peak input line voltage. The voltage rating of capacitor 204 should be greater than the maximum peak input line voltage. For input voltage maximums of less than about 35 volts, capacitor 204 is preferably about 220 μF. PNP transistor 216 should have a reverse breakdown voltage greater than the maximum peak input line voltage minus the value of the regulated voltage ($V_1$). Furthermore, PNP transistor 216 should have a power handling capability greater than the maximum peak input line voltage minus $V_1$ multiplied by the circuit current. Common input voltage ranges that voltage regulation circuitry 200 can be designed to regulate include AC and DC voltages ranging from about 110 volts to about 350 volts and AC and DC voltages ranging from about 10 volts to about 35 volts. Lower maximum input voltages permit physically smaller components to be used, and more narrow voltage ranges reduce the power dissipated by PNP transistor 216, making it less likely that a heat sink will be needed. Accordingly, occupancy sensor 1000 can be customized to operate within selected ranges of AC and DC input voltages.

Preferably, input voltage ranges are greater than about 20% of an input voltage which, for practical reasons (e.g., heat dissipation), should not exceed about 380 volts. Designing voltage regulation circuitry 200 for narrower input voltage ranges effectively reduces this feature of the present invention to known occupancy sensors.

Figure 3:
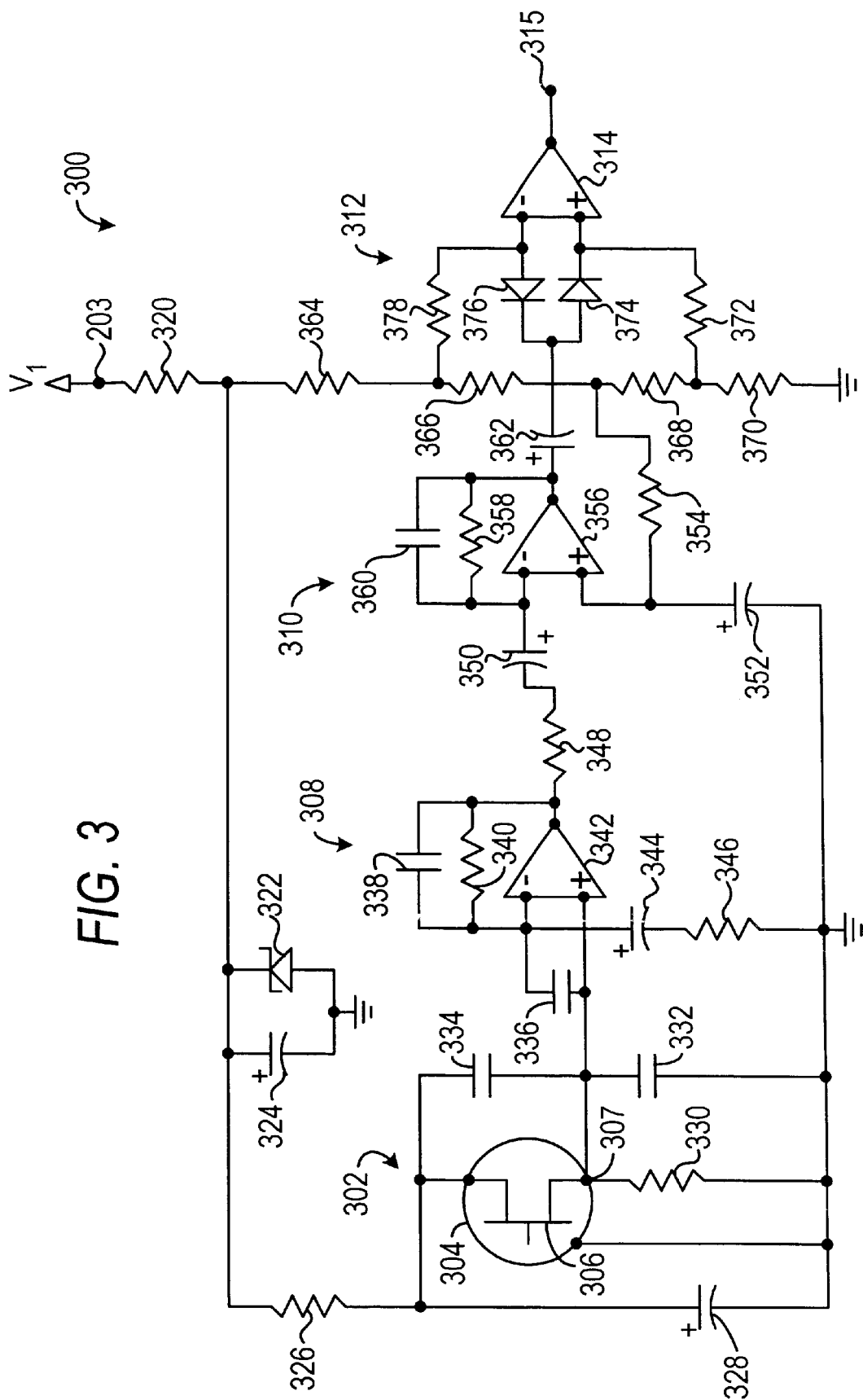
FIG. 3 is a circuit diagram of an exemplary embodiment of the sensing circuitry of the occupancy sensor of FIG. 1 according to the present invention.

An exemplary embodiment of sensing circuitry 300 constructed in accordance with the present invention is shown in FIG. 3. Sensing circuitry 300 preferably includes a passive infrared (PIR) sensing circuit 302. PIR sensing circuit 302 includes piezoelectric chip 304. When temperature in an area sensed by occupancy sensor 1000 increases (e.g., when a person enters the area), chip 304 generates a very small voltage with high impedance. FET transistor 306, which is included in chip 304, lowers the impedance to an acceptable level and outputs an activating signal at node 307. This activating signal is then filtered and amplified through voltage amplification stages 308 and 310. The activating signal is then fed to window comparator 312. When the positive or negative signal deviation exceeds the threshold of comparator 314, the output of comparator 314 at node 315 switches high (i.e., outputs a logical "1" signal). The activating signal at node 315 is then fed to output circuitry 400.

Sensing circuitry 300 also includes operational amplifiers (opamps) 342 and 356; diodes 322, 374, and 376; capacitors 324, 328, 332, 334, 336, 338, 344, 350, 352, 360, and 362; and resistors 320, 326, 330, 340, 346, 348, 354, 358, 364, 366, 368, 370, 372, and 378.

Figure 4:
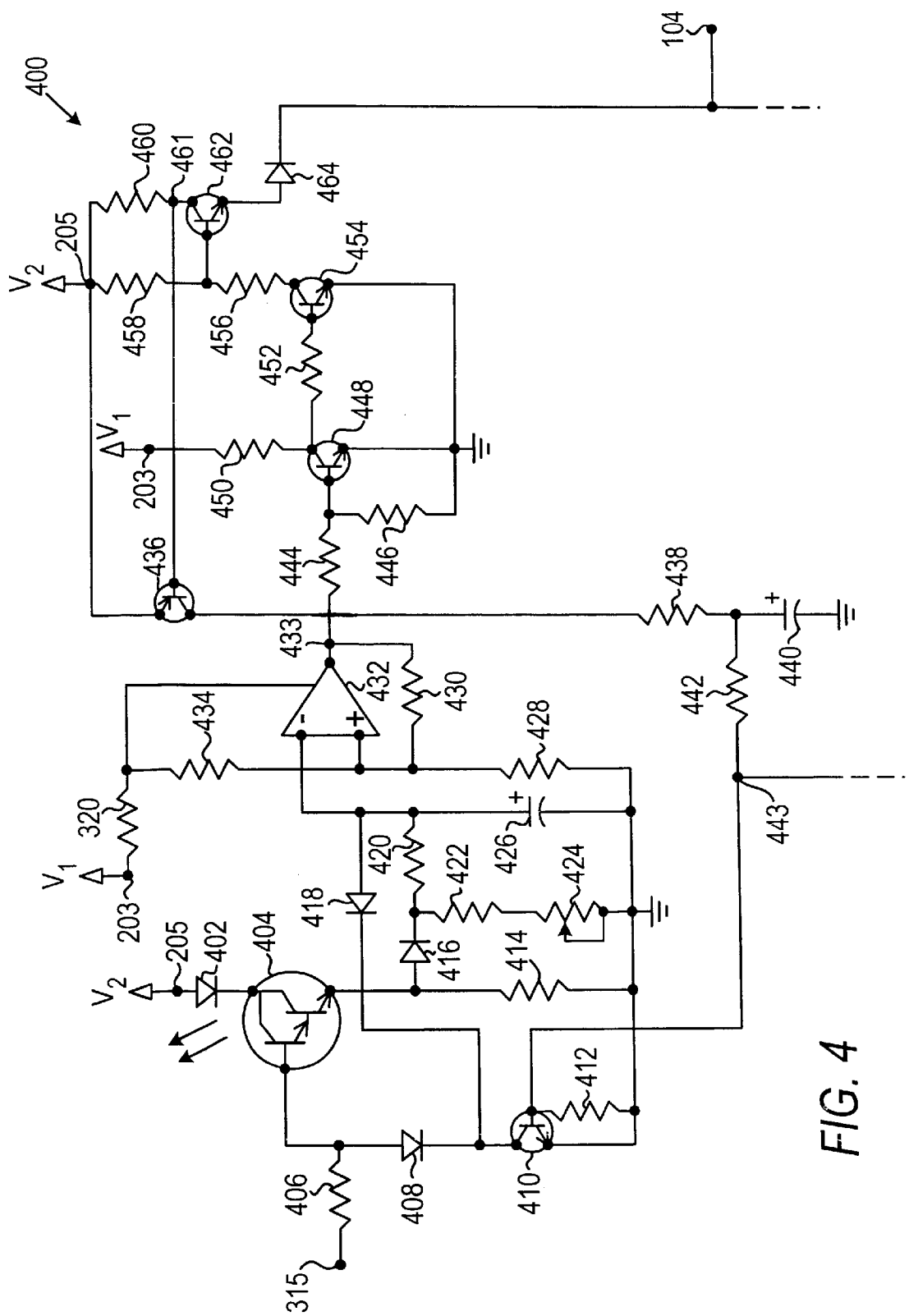
FIG. 4 is a circuit diagram of an exemplary embodiment of the output circuitry of the occupancy sensor of FIG. 1 according to the present invention.

An exemplary embodiment of output circuitry 400 constructed in accordance with the present invention is shown in FIG. 4. When an activating signal is received at node 315, NPN Darlington pair 404 turns ON (i.e., conducts), activating light emitting diode (LED) 402. Capacitor 426, which is normally discharged in stand-by mode, charges up, activating operational amplifier (opamp) 432. The output of opamp 432, at node 433, switches high. This turns ON NPN transistor 448, which turns OFF NPN transistor 454. NPN output transistor 462 then turns ON, outputting a logical "1" signal at first output terminal 104. The voltage level of the logical "1" signal is about $V_2$ (minus the small voltage drops across resistor 460, NPN output transistor 462, and diode 464). Note that the voltage level of a logical "1" signal at first output terminal 104 can alternatively be about $V_1$ by coupling resistor 460 to node 203 instead of node 205.

When node 315 goes low (indicating that the sensed area is no longer occupied), NPN Darlington pair 404 turns OFF (i.e., no longer conducts). Output circuitry 400 continues to maintain a logical "1" signal at first output terminal 104 until capacitor 426 discharges through resistors 420 and 422 and potentiometer 424. This discharge time, determined by the values of capacitor 426, resistors 420 and 422, and potentiometer 424, permits a person who momentarily leaves the sensed area to return without having the lights or other electrical appliances abruptly turned off. The discharge time can be adjusted by varying potentiometer 424, which is preferably externally accessible, and can typically range from 15 seconds to 20 minutes. Once capacitor 426 discharges, the output of opamp 432 switches low (i.e., outputs a logical "0" signal), resulting in a logical "0" signal at first output terminal 104.

Output circuitry 400 preferably includes a shut down mode to protect occupancy sensor 1000 from overloads and short circuits. PNP output transistor 462 is coupled as a common emitter to keep its saturation voltage low. The emitter of PNP output transistor 462 is coupled to $V_2$ through low value resistor 460 (which is preferably about 2.4 ohms). If excessive output current (i.e., output current beyond what sensor 1000 can safely supply) is drawn from first output terminal 104, the voltage drop across resistor 460 increases, causing the voltage at node 461 to decrease such that PNP transistor 436 turns ON. Capacitor 440 then charges up, turning NPN transistor 410 ON. This provides a path to ground from node 315 through diode 408, which prevents any activating signal at node 315 from being processed by output circuitry 400. Furthermore, charged capacitor 426 can now discharge through diode 418 and NPN transistor 410. When capacitor 426 discharges, the output of opamp 432 switches high, NPN transistor 448 turns ON, NPN transistor 454 turns OFF, and PNP output transistor 462 turns OFF, thus effectively shutting down sensor 1000.

After PNP output transistor 462 turns OFF, the voltage at node 461 increases turning PNP transistor 436 OFF. Capacitor 440 then discharges through resistors 442 and 412. Occupancy sensor 1000 remains shut down until capacitor 440 discharges, which is determined by the values of capacitor 440 and resistors 442 and 412. When capacitor 440 is discharged, NPN transistor 410 turns OFF, permitting output circuitry 400 to again process activating signals received at node 315. Sensor 1000 then resumes normal operation. If the condition causing the excessive output current still exists upon resumption of normal operation, sensor 1000 will again shutdown as described above.

Diode 464, coupled in series between the collector output of PNP transistor 462 and output terminal 104, provides additional protection to occupancy sensor 1000 by preventing possibly damaging current flow into sensor 1000 should first output terminal 104 be coupled to a voltage higher than $V_2$.

Output circuitry 400 also includes diode 416, node 443, and resistors 406, 414, 428, 430, 434, 438, 444, 446, 450, 452, 456, and 458.

Figure 5:
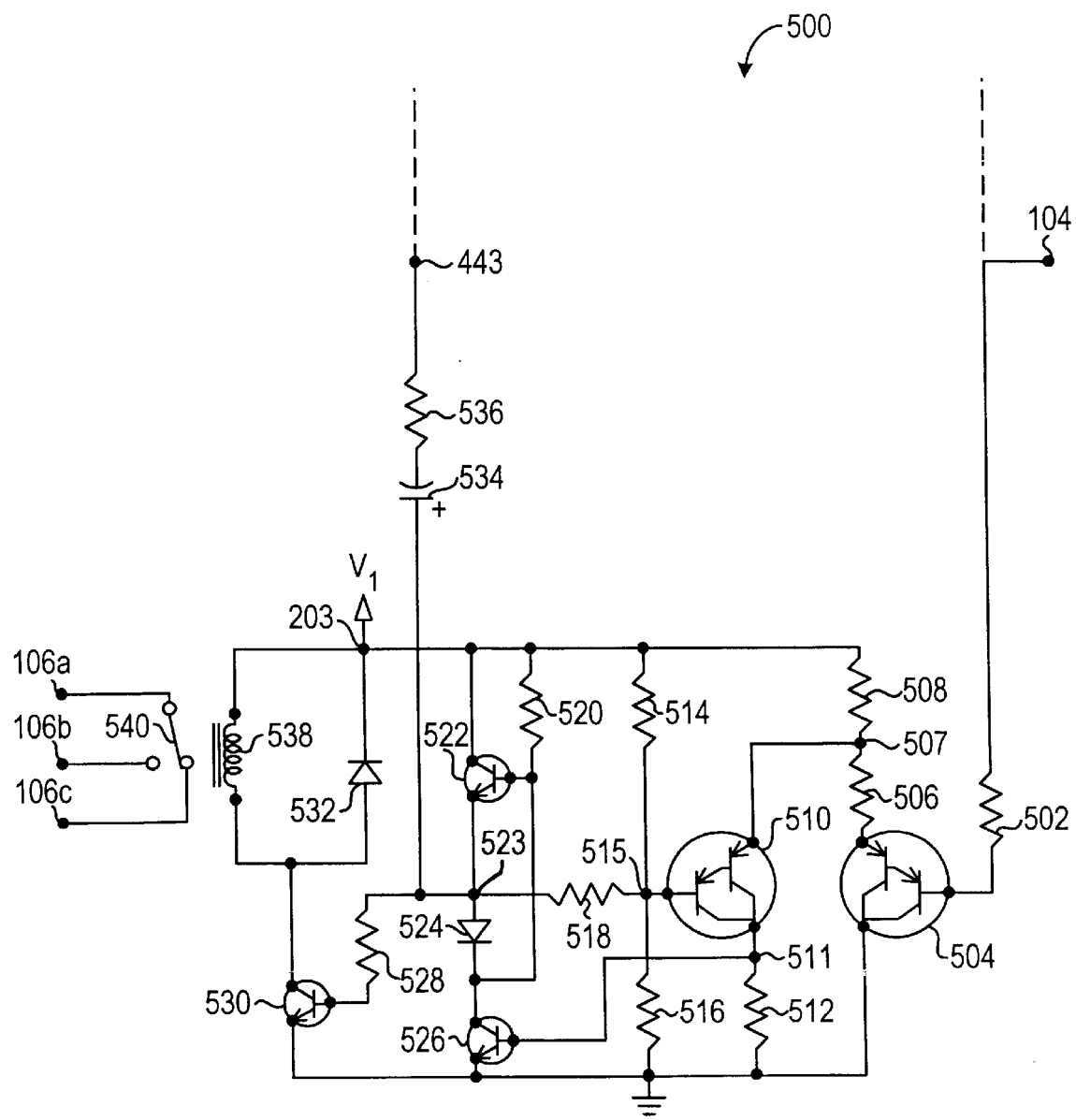
FIG. 5 is a circuit diagram of an exemplary embodiment of the output follower circuitry of the occupancy sensor of FIG. 1 according to the present invention.

FIG. 5 shows an exemplary embodiment of output follower circuitry 500 constructed in accordance with the present invention. Output follower circuitry 500 monitors first output terminal 104 and generates occupancy signals indicative of occupancy signals monitored at first output terminal 104. The generated occupancy signals are output at second output terminal 106, which can thus provide occupancy signals for a second function electrically unrelated to a first function supplied by occupancy signals at first output terminal 104.

Output follower circuitry 500 preferably includes relay coil 538, and output terminal 106 preferably includes dry contacts 106a,b,c. Relay coil 538 and contacts 106a,b,c provide occupancy sensor 1000 with a high degree of versatility for coupling to various control devices having different input signal requirements and input circuit configurations. For example, contacts 106a and 106b, which are shown in FIG. 5 open circuited (i.e., in stand-by mode), can be coupled to the appropriate input terminals of a control device that merely requires an open circuit in stand-by mode and a closed circuit in occupancy mode. When occupancy is sensed, coil 538 causes armature 540 to close contacts 106a and 106b (contact 106c is left floating). Note that when contacts 106a,b,c are coupled in this manner, circuitry 500 provides no current or voltage; the control device provides the necessary electrical parameters.

Alternatively, contacts 106a and 106c can be coupled to a control device that requires a closed circuit in stand-by mode and an open circuit in occupancy mode. When occupancy is sensed, coil 538 causes armature 540 to open contacts 106a and 106c (contact 106b is left floating).

For control devices that require a logical "1" signal for occupancy mode and a logical "0" signal for stand-by mode, contact 106a can be coupled to the control device, contact 106b can be coupled to, for example, input voltage terminal 102, and contact 106c can be coupled to ground or neutral. When occupancy is sensed, coil 538 causes armature 540 to close contacts 106a and 106b, providing a logical "1" signal (at the input voltage level) to the control device.

Similarly, for control devices that require a logical "1" signal for stand-by mode and a logical "0" signal for occupancy mode, contact 106a can be coupled to the control device, contact 106b can be coupled to ground or neutral, and contact 106c can be coupled to, for example, input voltage terminal 102. When occupancy is sensed, coil 538 causes armature 540 to close contacts 106a and 106b, providing a logical "0" signal (at ground potential) to the control device.

Persons with ordinary skill in the art will recognize that other output coupling configurations with contacts 106a,b,c are possible (e.g., to provide a control device with different voltage levels for occupancy and stand-by, contact 106a can be coupled to the control device, contact 106b can be coupled to one voltage, and contact 106c can be coupled to another voltage).

To reduce current demand while occupancy sensor 1000 is in occupancy mode (which is usually when current demand peaks), coil 538 preferably de-energizes in occupancy mode and energizes in stand-by mode. This results in sensor 1000 having a more constant average current.

Output follower circuitry 500 also includes diodes 524 and 532 and resistors 502, 512, 514, 516, and 528.

Output follower circuitry 500 preferably operates as follows: when first output terminal 104 is low, indicating that occupancy sensor 1000 is in stand-by mode, PNP Darlington pair 504 is ON. Current is drawn through resistors 508 and 506, causing the voltage at node 507 to decrease. The resulting difference between the voltages at nodes 515 and 507 is small (i.e., less than about 1 volt), turning PNP Darlington pair 510 OFF. Current no longer flows through node 511, which causes NPN transistor 526 to turn OFF. This causes NPN transistor 522 to turn ON, which increases the voltage at node 523, providing base current to NPN transistor 530. NPN transistor 530 turns ON, causing current to flow through coil 538. This causes armature 540 to open contacts 106a and 106b and to close contacts 106a and 106c.

When first output terminal 104 switches from low to high (indicating occupancy), PNP Darlington pair 504 turns OFF. This increases the voltage at node 507, causing the difference between voltages at nodes 515 and 507 to increase. PNP Darlington pair 510 then turns ON, permitting current to flow through node 511. This turns ON NPN transistor 526. Current through resistor 520 is now drawn away from the base of NPN transistor 522, turning it OFF. The voltage at node 523 goes low, turning NPN transistor 530 OFF. This ceases current flow through coil 538, causing armature 540 to open contacts 106a and 106c and to close contacts 106a and 106b.

The operation of armature 540 typically causes electrical disturbances that can falsely trip sensing circuitry 300 when occupancy sensor 1000 switches from occupancy mode to stand-by mode. To prevent such false tripping, sensor 1000 preferably includes capacitor 534 and resistor 536. When the occupancy signal at first output terminal 104 goes low (indicating no occupancy), node 523 goes from low to high. This transition sends a logical "1" signal through capacitor 534 (which acts like a short circuit) to NPN transistor 410 in output circuitry 400. NPN transistor 410 responds by turning ON, preventing the processing of activating signals at node 315 (which are likely caused by the operation of armature 540 with contacts 106a,b,c rather than the sensing of occupancy). This effect lasts until capacitor 534 charges up (which then acts like an open circuit). Capacitor 534 charge-up time is determined by the values of capacitor 534 and resistor 536, and preferably equals the time needed for any electrical disturbances to subside. When output terminal 104 switches from low to high, NPN transistor 526 turns ON, node 523 goes low, and capacitor 534 discharges through diode 524 and NPN transistor 526.

High value resistor 518 (which is preferably about 4.7M ohms) provides a positive feedback path between node 523 and 515. This causes PNP Darlington pair 510 to switch more quickly. Moreover, when node 523 goes low, resistor 518 pulls node 515 slightly lower, causing PNP Darlington pair 510 to turn more fully ON. When node 523 goes high, resistor 518 pulls node 515 slightly higher, causing PNP Darlington pair 510 to turn more fully OFF.

PNP Darlington pair 504 substantially prevents output follower circuitry 500 from loading first output terminal 104 because of its very high input impedance, which is about 100M ohms. Optionally, to further eliminate any loading on first output terminal 104 when occupancy sensor 1000 switches from occupancy mode to stand-by mode, a control device coupled to first output terminal 104 should preferably ground output terminal 104 when the occupancy signal decreases to about 0.9 volts. This prevents any current flow into PNP Darlington pair 504, which turns ON at about 0.7 volts. Thus no current is drawn from first terminal 104 as the occupancy signal switches from logical "1" to logical "0."

Figure 6:
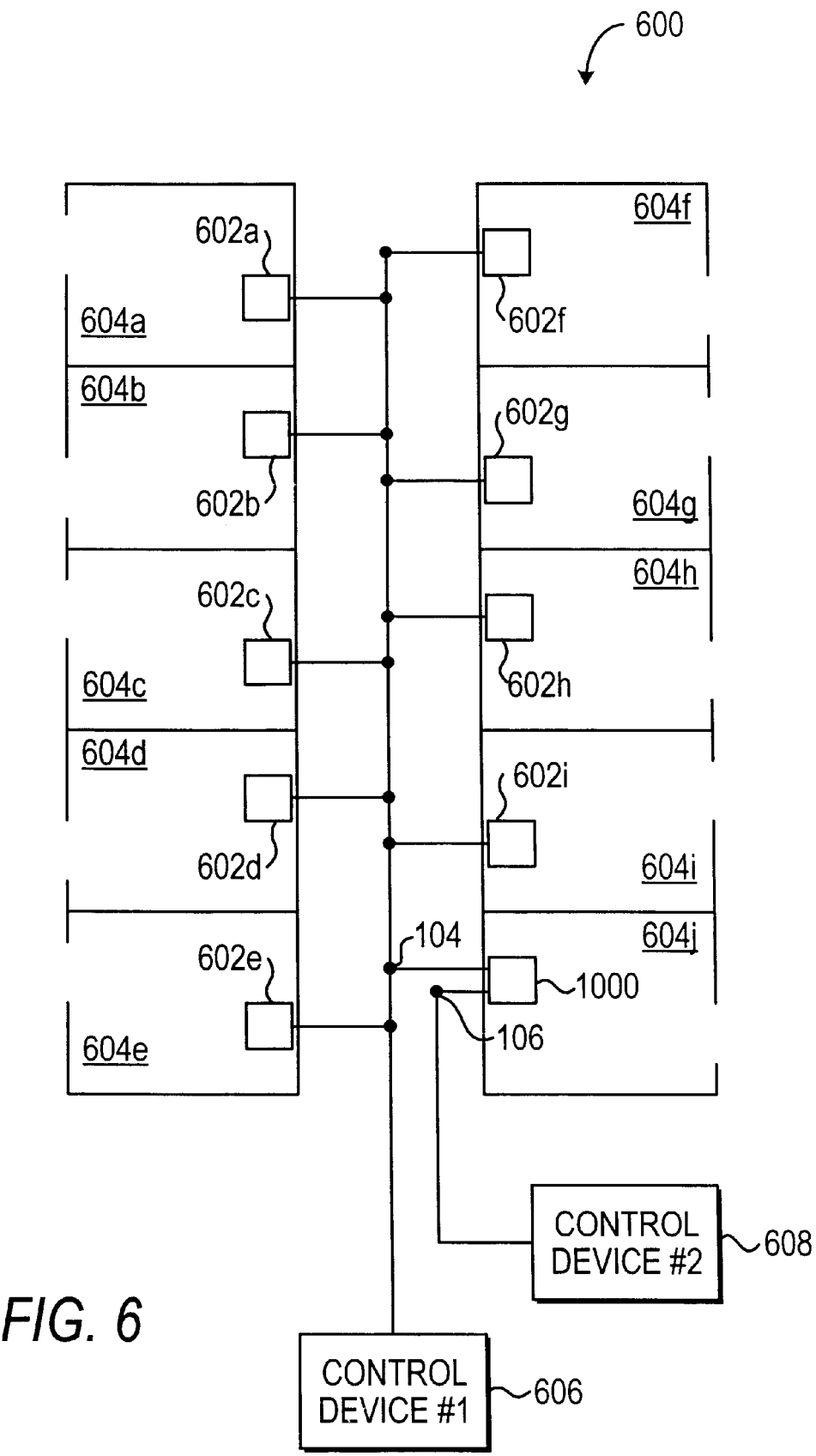
FIG. 6 is a plan view block diagram of an exemplary embodiment of an occupancy sensor system according to the present invention.

FIG. 6 is a plan view block diagram of an exemplary embodiment of occupancy sensor system 600 constructed in accordance with the present invention. System 600 illustrates an advantage of output follower circuitry 500 when a plurality of occupancy sensors jointly provide occupancy signals to two control devices that require electrically incompatible input signals.

Occupancy sensor system 600 includes occupancy sensors 602*a–i* and 1000, which are respectively deployed in areas 604*a–j*. Occupancy sensors 602*a–i* can be single-output sensors, and areas 604*a–j* may be offices, work space cubicles, or the like. The outputs of occupancy sensors 602*a–i* and first output terminal 104 of sensor 1000 are coupled in parallel and to control device 606. Control device 606 controls one or more electrical appliances covering areas 604*a–j*, such as, for example, area lighting or HVAC. An occupancy signal generated by any one of occupancy sensors 602*a–i* and 1000 is transmitted to control device 606. Second output terminal 106 of sensor 1000 is coupled to control device 608, which has input signal requirements different from control device 606 and may be, for example, a computerized building automation system.

Advantageously, because occupancy sensor 1000 includes output follower circuitry 500 and second output terminal 106, occupancy sensors 602*a–i* do not require second output terminals nor associated output circuitry to provide occupancy signals to control device 608. Sensor 1000 generates occupancy signals for second output terminal 106 in response to occupancy signals generated by any one of sensors 602*a–i* and 1000 that are present at first output terminal 104. Thus, occupancy sensors 602*a–i* can be less expensive single-output sensors. Furthermore, occupancy sensor 1000 eliminates the need to separately wire a second output from each occupancy sensor to control device 608, thus advantageously reducing material and installation costs. Moreover, sensor 1000 can be located in the area closest to control device 608 to further reduce material and installation costs.

Thus it is seen that occupancy sensors are provided that operate within an extended range of AC and DC input voltages, draw substantially only an amount of current required by a sensor at the moment, operate with a small difference between peak and average currents, shut down when output current becomes excessive, and provide occupancy signals at a second output terminal in response to the presence of occupancy signals at a first output terminal. Persons skilled in the art will appreciate that the present invention can be practiced by other than the described embodiments, which are presented for purposes of illustration and not of limitation, and the present invention is limited only by the claims which follow.

We claim:

1. An occupancy sensor operable to provide occupancy signals to at least one control device, said sensor comprising:

an input voltage terminal for receiving an input voltage;

sensing circuitry operable to sense occupancy within a designated area, said sensing circuitry including an opamp that amplifies signals indicating occupancy;

output circuitry coupled to said sensing circuitry and operable to generate a first occupancy signal, said output circuitry including a capacitor that charges and discharges in response to signals received from said sensing circuitry, said output circuitry also including an output transistor whose ON/OFF state is determined by whether said capacitor is charged or discharged;

a first output terminal coupled to said output transistor of said output circuitry for outputting said first occupancy signal; and voltage regulation circuitry operable to regulate either AC or DC input voltages within a range of voltages, said range having a lower limit between about 3 volts and about 9 volts and an upper limit not exceeding about 380 volts, said regulation circuitry coupled to said input voltage terminal, to said sensing circuitry, and to said output circuitry, said regulation circuitry including a variable resistance coupled to said input voltage terminal.

2. The occupancy sensor of claim 1 wherein said regulation circuitry regulates AC input voltages ranging from about 3 volts to about 380 volts.

3. The occupancy sensor of claim 1 wherein said regulation circuitry regulates DC input voltages ranging from about 3 volts to about 380 volts.

4. The occupancy sensor of claim 1 further comprising:

a second output terminal for outputting a second occupancy signal, and output follower circuitry operable to monitor said first output terminal and to generate a second occupancy signal indicative of a first occupancy signal monitored at said first output terminal, said output follower circuitry coupled to said regulation circuitry, to said first output terminal, and to said second output terminal, said output follower circuitry including a transistor whose base is coupled to said first output terminal.

5. The occupancy sensor of claim 4 wherein said first and second occupancy signals respectively conform to different control device input signal requirements.

6. The occupancy sensor of claim 4 wherein said output follower circuitry comprises a relay coil, said relay coil being energized when occupancy is not sensed and de-energized when occupancy is sensed.

7. The occupancy sensor of claim 6 wherein said second output terminal comprises a plurality of dry contacts.

8. The occupancy sensor of claim 4 wherein said output follower circuitry has very high input impedance at said first output terminal for substantially preventing any loading on said first output terminal by said output follower circuitry.

9. The occupancy sensor of claim 4 wherein said output follower circuitry is coupled to said output circuitry via a capacitor and resistor coupled in series, and wherein said output follower circuitry substantially prevents first occupancy signals from being generated while a second occupancy signal indicating occupancy switches to a second occupancy signal indicating non-occupancy.

10. The occupancy sensor of claim 1 wherein said sensor draws substantially only an amount of current required by said sensor at the moment.

11. The occupancy sensor of claim 1 wherein said output circuitry shuts down when output current is excessive.

12. The occupancy sensor of claim 1 wherein:

(a) said output circuitry shuts down for a predetermined time period when output current exceeds a predetermined amount;

(b) said output circuitry resumes operation after said predetermined time period; and
(c) said output circuitry repeats (a) and (b) until said output current no longer exceeds said predetermined amount.

13. The occupancy sensor of claim 1 wherein said upper limit is at least about 48 volts.

14. An occupancy sensor system operable to provide occupancy signals to at least two control devices, said system comprising:
a plurality of occupancy sensors, each sensor comprising:
an input voltage terminal for receiving an input voltage,
sensing circuitry operable to sense occupancy within a designated area,
output circuitry coupled to said sensing circuitry and operable to generate a first occupancy signal,
a first output terminal coupled to said output circuitry for outputting said first occupancy signal, and
voltage regulation circuitry coupled to said input voltage terminal and operable to provide a DC voltage to said sensing circuitry and to said output circuitry; wherein:
said first output terminals of said plurality of occupancy sensors are coupled in parallel; and
at least one of said plurality of occupancy sensors further comprises:
a second output terminal for outputting a second occupancy signal, and
output follower circuitry operable to monitor said first output terminal of said at least one occupancy sensor and to generate a second occupancy signal indicative of a first occupancy signal monitored at said first output terminal, said output follower circuitry coupled to said regulation circuitry, to said first output terminal, and to said second output terminal of said at least one occupancy sensor.

15. The system of claim 14 wherein said first and second occupancy signals respectively conform to different control device input signal requirements.

16. The system of claim 14 wherein said output follower circuitry comprises a relay coil, said relay coil being energized when occupancy is not sensed and de-energized when occupancy is sensed.

17. The system of claim 16 wherein said second output terminal comprises a plurality of dry contacts.

18. The system of claim 14 wherein said output follower circuitry has very high input impedance at said first output terminal for substantially preventing any loading on said first output terminal by said output follower circuitry.

19. The system of claim 14 wherein said output follower circuitry is coupled to said output circuitry and said output follower circuitry substantially prevents first occupancy signals from being generated while a second occupancy signal indicating occupancy switches to a second occupancy signal indicating non-occupancy.

20. A method of operating an occupancy sensor to provide occupancy signals to at least one control device, said method comprising:
regulating a DC input voltage that is within a range of voltages to provide a regulated DC voltage to occupancy sensor circuitry, said range being from about 3 volts to about 380 volts;
sensing occupancy within a designated area;
generating a signal indicating occupancy; and
outputting said signal at an output terminal.

21. The method of claim 20 further comprising drawing substantially only an amount of current required by said sensor at the moment.

22. The method of claim 20 further comprising:
monitoring said output terminal;
generating a second signal in response to a first signal monitored at said output terminal; and
outputting said second signal at a second output terminal.

23. The method of claim 22 further comprising preventing said first signal from switching while a second signal switches from indicating occupancy to indicating non-occupancy.

24. The method of claim 22 wherein said first and second signals respectively conform to different electrical parameters.

25. The method of claim 22 wherein said occupancy sensor comprises a relay coil, said method further comprising:
energizing said relay coil when occupancy is not sensed; and
de-energizing said relay coil when occupancy is sensed.

26. The method of claim 20 further comprising:
monitoring output current at said output terminal; and
shutting down said sensor when said output current is excessive.

27. The method of claim 26 further comprising resuming sensor operation after a predetermined time period.

28. An occupancy sensor operable to provide occupancy signals to at least one control device, said sensor comprising:
an input voltage terminal for receiving an input voltage;
sensing circuitry operable to sense occupancy within a designated area, said sensing circuitry including an opamp that amplifies signals indicating occupancy;
output circuitry coupled to said sensing circuitry and operable to generate an occupancy signal, said output circuitry including a capacitor that charges and discharges in response to signals received from said sensing circuitry, said output circuitry also including an output transistor whose ON/OFF state is determined by whether said capacitor is charged or discharged;
an output terminal coupled to said output transistor of said output circuitry that provides said occupancy signal; and
voltage regulation circuitry operable to regulate either AC or DC input voltages within a range of voltages, said range having a lower limit of not less than about 48 volts and an upper limit of not more than about 100 volts, said regulation circuitry coupled to said input voltage terminal, to said sensing circuitry, and to said output circuitry, said regulation circuitry including a variable resistance coupled to said input voltage terminal.

29. The occupancy sensor of claim 28 wherein said lower limit is about 48 volts and said upper limit is about 100 volts.

30. An occupancy sensor operable to provide occupancy signals to at least one control device, said sensor comprising:
an input voltage terminal for receiving an input voltage;
sensing circuitry operable to sense occupancy within a designated area, said sensing circuitry including an opamp that amplifies signals indicating occupancy;
output circuitry coupled to said sensing circuitry and operable to generate an occupancy signal, said output circuitry including a capacitor that charges and discharges in response to signals received from said sensing circuitry, said output circuitry also including an output transistor whose ON/OFF state is determined by whether said capacitor is charged or discharged;

an output terminal coupled to said output transistor of said output circuitry for outputting said occupancy signal; and voltage regulation circuitry operable to regulate either AC or DC input voltages within a range of voltages, said range having a lower limit of not more than about 100 volts and an upper limit of between about 155 volts and about 380 volts, said regulation circuitry coupled to said input voltage terminal, to said sensing circuitry, and to said output circuitry, said regulation circuitry including a variable resistance coupled to said input voltage terminal.

31. The occupancy sensor of claim 30 wherein said lower limit is about 100 volts and said upper limit is about 380 volts.

32. A method of providing occupancy signals to more than one control device with an occupancy sensor having first and second output terminals, said method comprising:

generating a first occupancy signal;

outputting said first occupancy signal at said first output terminal;

generating a second occupancy signal in response to said first occupancy signal being at said first output terminal; and outputting said second occupancy signal at said second output terminal.

33. The method of claim 32 further comprising preventing said first occupancy signal from switching while said second occupancy signal switches from indicating occupancy to indicating non-occupancy.

34. The method of claim 32 wherein said occupancy sensor comprises a relay coil, said method further comprising:

energizing said relay coil when occupancy is not sensed; and de-energizing said relay coil when occupancy is sensed.

* * * * *

UNITED STATES PATENT AND TRADEMARK OFFICE
CERTIFICATE OF CORRECTION

PATENT NO. : 6,304,180 B1  Page 1 of 1
DATED : October 16, 2001
INVENTOR(S) : Brian P. Platner et al.

It is certified that error appears in the above-identified patent and that said Letters Patent is hereby corrected as shown below:

<u>Column 2,</u>
Line 45, change "only generated" to -- generated --.

Signed and Sealed this

Second Day of April, 2002

Attest:

Attesting Officer

JAMES E. ROGAN
Director of the United States Patent and Trademark Office